Figure 2:
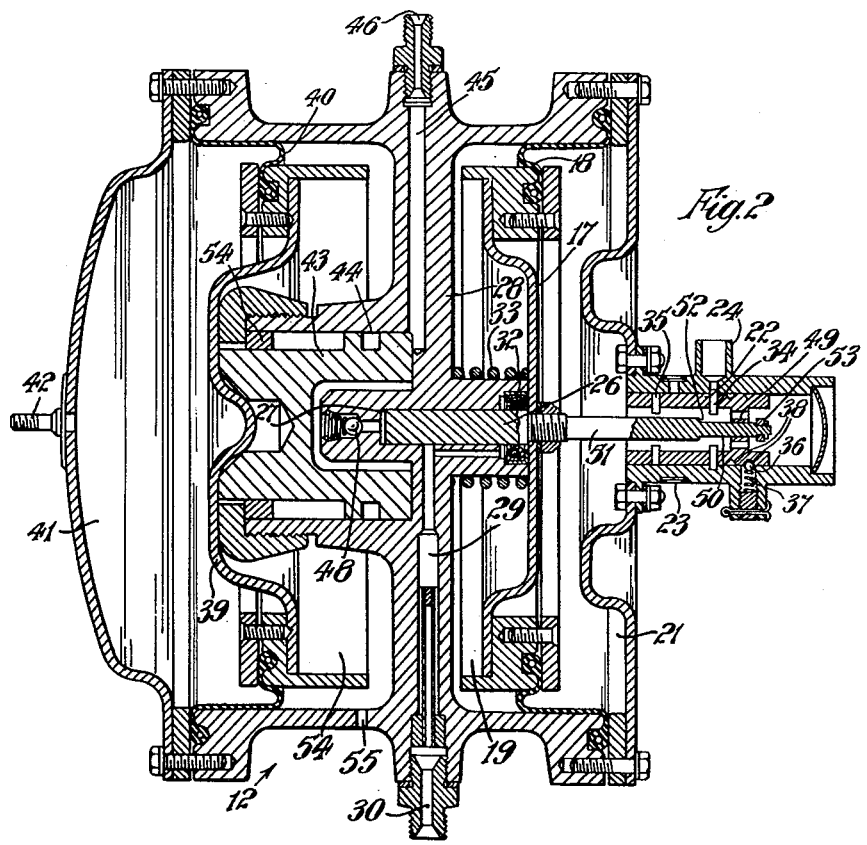

July 17, 1962  W. H. BENT  3,044,405
FLUID PRESSURE GENERATOR AND ACCUMULATOR ASSEMBLY
Filed Nov. 24, 1958  4 Sheets-Sheet 1
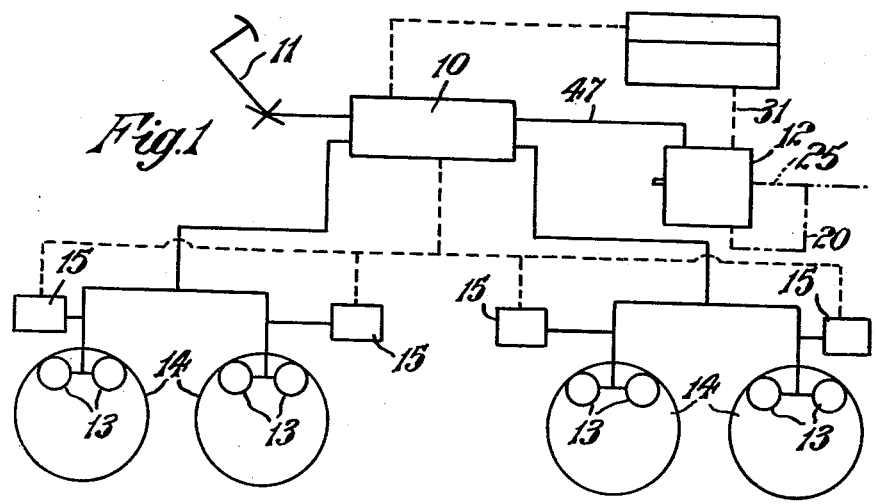
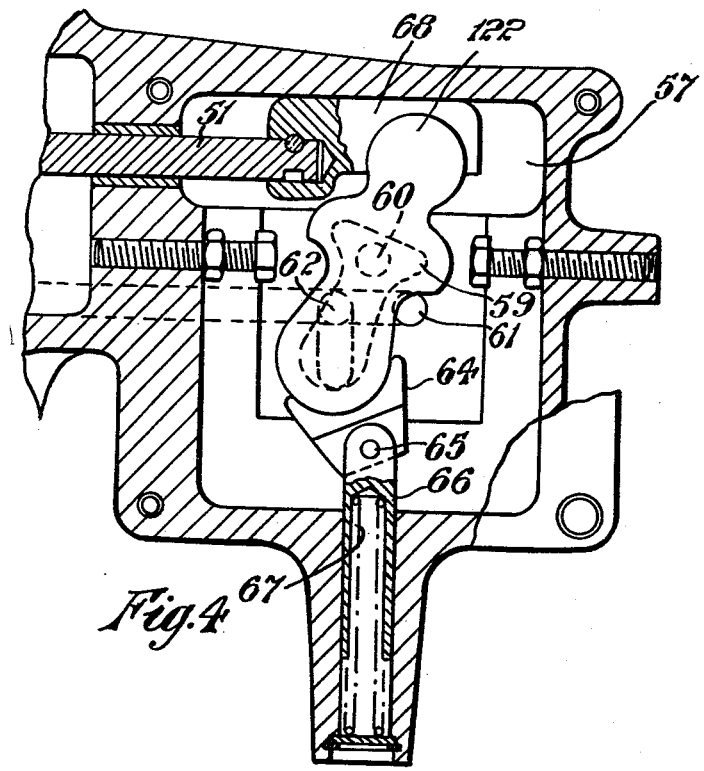
INVENTOR
William Harold Bent
by Benj. T. Rauber
his attorney July 17, 1962 W. H. BENT 3,044,405
FLUID PRESSURE GENERATOR AND ACCUMULATOR ASSEMBLY
Filed Nov. 24, 1958 4 Sheets-Sheet 2

INVENTOR
William Harold Bent
by Benj. T. Pauber
his attorney

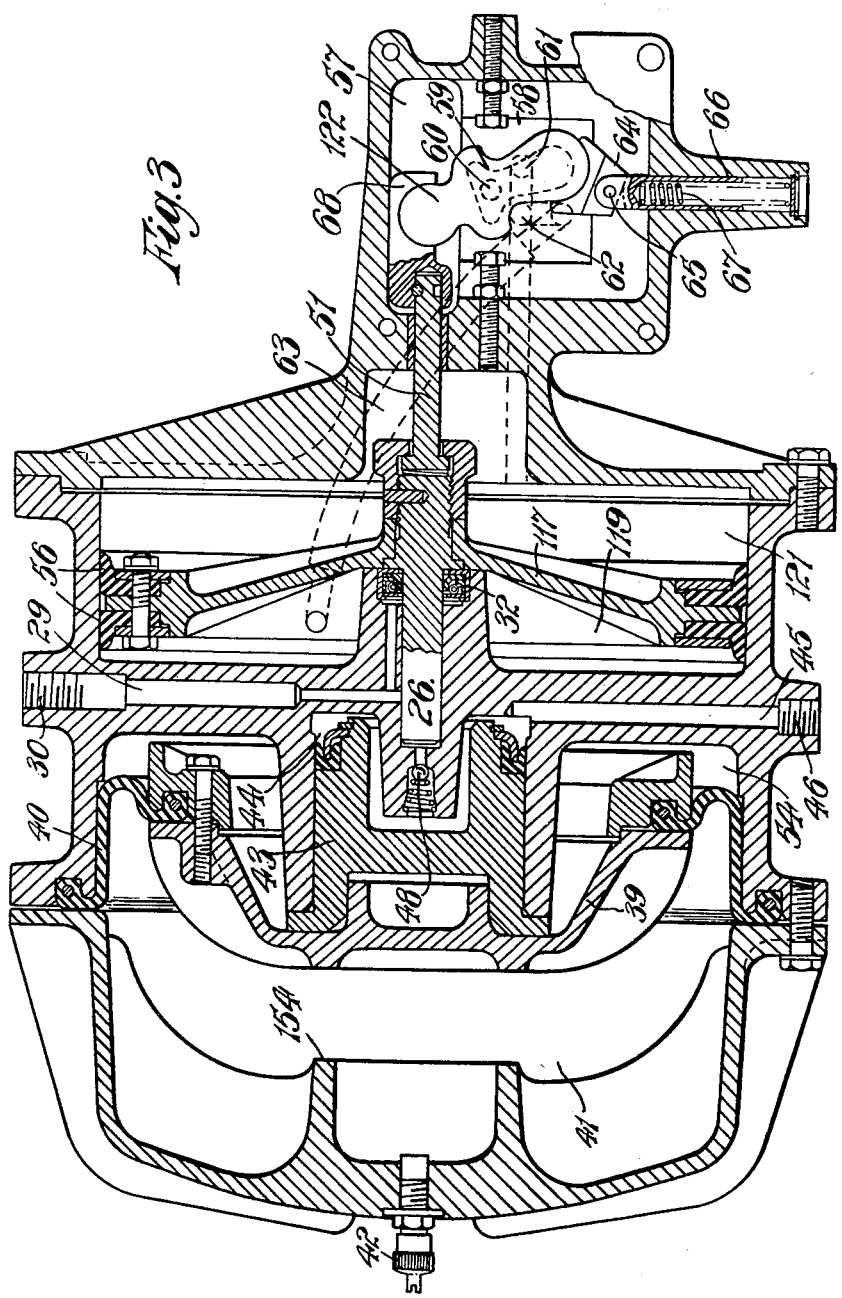

July 17, 1962 W. H. BENT 3,044,405
FLUID PRESSURE GENERATOR AND ACCUMULATOR ASSEMBLY
Filed Nov. 24, 1958 4 Sheets-Sheet 4

INVENTOR
William Harold Bent
by Benj. T. Rauber
his attorney

United States Patent Office 3,044,405
Patented July 17, 1962

3,044,405
FLUID PRESSURE GENERATOR AND
ACCUMULATOR ASSEMBLY
William Harold Bent, Leicester, England, assignor to
Dunlop Rubber Company Limited, London, England,
a British company
Filed Nov. 24, 1958, Ser. No. 775,773
Claims priority, application Great Britain Dec. 3, 1957
6 Claims. (Cl. 103—50)

This invention relates to a fluid-pressure pump, and more particularly relates to a self-contained hydraulic pump and accumulator unit.

Hydraulic pumps are increasingly being employed in motor road vehicles for the operation of hydraulic brakes, power-assisted steering, oleo-pneumatic springing and the like. Normally such pumps are continuously driven by the engine or gear box, a cut-out mechanism directing the pump output back to a liquid reservoir when the accumulator pressure attains a predetermined value, so that, when the accumulator is fully charged, pressure liquid is kept circulating through the system. Such systems are heavy, expensive and difficult to maintain and they cannot readily be adapted for installation on existing vehicles.

The object of the present invention is to provide an improved fluid pressure pump and more particularly an hydraulic pump for vehicles and the like. Another object of the invention is to provide a self-contained, compact hydraulic pump and accumulator unit which is fully automatic in operation and which can readily be fitted to existing installations.

The invention provides a pump for delivering fluid under pressure and comprising a pump chamber, a fluid driven reciprocating motor member of large effective area, a pump of smaller cross-sectional area attached to and driven by the motor member, and a valve operatively connected to the motor member and movable thereby to connect in alternative end positions of the motor member at least one side of the motor member to one or other of two inlets providing a source of differential fluid pressure.

Owing to the fact that the motor member is of larger area than the plunger, the pump is capable of delivering fluid under substantial pressure, notwithstanding the fact that the motor member is actuated by a small differential fluid pressure.

The pump may be single acting, in which case the valve connects the portion of the pump chamber on one side of the pumping member alternately to the two inlets and a pressure equal to that at one of the inlets or intermediate the pressures at the two inlets is applied to the other side of the pumping member. Alternatively the pump may be double acting and the valve arranged, whenever the pumping member reaches an end position, to reverse connections between the inlets and the ends of the pump chamber.

When the pump is fitted to a motor road vehicle, one inlet may be subject to atmospheric pressure and the other inlet connected to a source of sub-atmospheric pressure, e.g. the induction side of the engine manifold, or to a source of superatmospheric pressure, e.g. to the output side of an oil pump supplying lubricating oil to the engine.

The invention includes, in combination with a hydraulic pump as described above, a hydraulic accumulator comprising a piston movable in a chamber supplied with liquid under pressure by the pump against a resilient pressure loading, the combination being referred to as a power pack.

Figure 5:
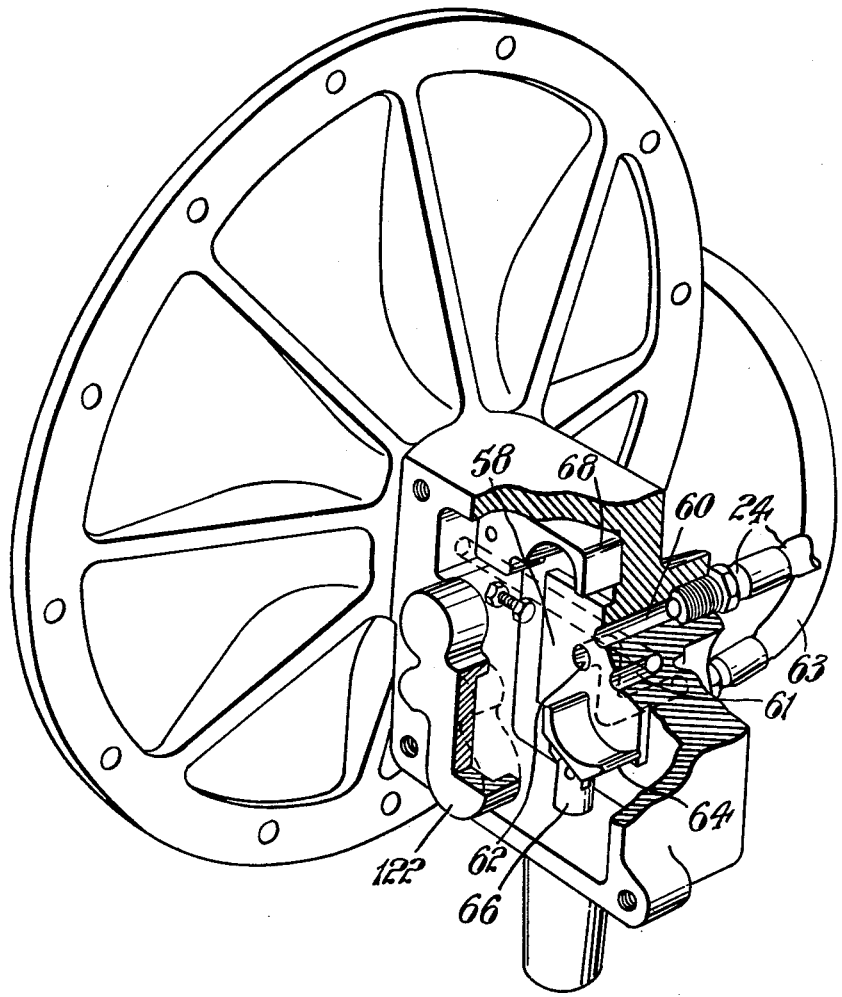

Two alternative embodiments of the invention will now be described in more detail, by way of example, with reference to the accompanying drawings in which:

FIGURE 1 is a diagraam of a vehicle braking system provided with a vacuum operated hydraulic power pack according to the invention, FIGURE 2 shows one form of power pack in longitudinal section, FIGURE 3 is a similar view of an alternative form of power pack, FIGURE 4 shows the right hand end of the power pack of FIGURE 3 with the valve in an alternative position, and FIGURE 5 is a perspective view, partly in section of the pump of the power pack shown in FIGURES 3 and 4.

Like reference characters indicate like parts throughout the figures.

The braking system shown in FIGURE 1 includes a power valve mechanism 10, of the construction described in application of Mortimer and Best, Ser. No. 775,742 filed November 24, 1958, now U.S. Patent No. 2,992,046, which is operable by a brake pedal 11 to supply oil under pressure from a power pack 12 to brake cylinders 13 associated with the wheels 14 of the vehicle. The system includes anti-skid valves 15 which open in the event of the wheels skidding when braked, to allow liquid to return from the brake cylinders to the tank 16 as indicated in chain lines.

The power pack 12 shown in FIGURE 2 has within its casing a motor chamber within which is reciprocably mounted a motor member constituted by a rigid diaphragm 17 connected at its outer periphery to the wall of the motor chamber by a flexible diaphragm 18 and dividing the chamber into a forward compartment 19 and a rear compartment 21. The compartment 19 of the motor chamber is maintained permanently under vacuum supplied by a line 20 (FIGURE 1) connecting the chamber to the inlet manifold of the engine at a point below the throttle butterfly. The rear compartment 21 of the motor chamber is connected alternately, by a valve 22 fixed to the diaphragm 17, to an inlet 23 open to atmosphere and to a vacuum inlet 24 connected to the line 25 (FIGURE 1). The valve 22 has a neck 49 engaging a reduced diameter portion 50 of a rod 51 fixed to the diaphragm 17.

A plunger 26 fixed to the diaphragm 17 is free to reciprocate in a cylinder 27 formed in a partition wall 28 extending transversely across the casing of the power pack and communicating, via a passage 29, with an inlet 30 connected by a line 31 (FIGURE 1) with the tank. A cup seal 32 prevents liquid from leaking into the motor chamber and a spring 33 mounted in compression between the wall 28 and the diaphragm 17 urges the latter to the right.

When the diaphragm 17 occupies the left hand end position shown in FIGURE 2, the space 21 is connected to the vacuum inlet 24 via a port 34 in the valve 22. The diaphragm or motor member 17 is accordingly moved to the right by the spring 33, causing the plunger 26 to perform a suction stroke and draw liquid from the inlet 30 into the cylinder 27. When the diaphragm 17 has nearly reached the end of its travel a shoulder 52 on the rod 51 engages the neck 49 and moves the valve 22 to the right. Movement of the valve 22 to the right cuts off communication between the port 34 and the vacuum inlet 24 and brings another port 35 in the valve into register with the atmospheric inlet 23, so admitting air at atmospheric pressure to the space 21 with the result that the diaphragm 17 moves to the left to cause the plunger 26 to perform a pumping stroke. Near the end of the travel of the diaphragm 17 to the left a shoulder 53 on the rod 51 engages the neck 49 to move the valve 22 to the left and back to the position illustrated in FIGURE 2. The connections of the space 21 to the inlets 23, 24 are then again reversed so that, until its motion is arrested by filling of the hydraulic accumulator as later described, the pump automatically continues to operate under the pressure differential applied to the inlets 23, 24. The valve 22 is held in one or other of its two alternative positions (until displaced by the rod 51), by engagement of a ball 36, with one or other of two annular grooves 38 in the valve: the ball is loaded by a spring 37.

At the other end of the casing of the power pack is a pressure chamber containing a reciprocable accumulator member such as the rigid diaphragm 39 attached at its periphery to the wall of the chamber by a flexible diaphragm 40 and dividing the accumulator chamber into a pressurizing compartment 41. The pressurizing compartment 41 has a standard tyre inflation valve 42, whereby the space 41 is charged with air at a predetermined pressure, e.g. 100 p.s.i. Fixed to the other side of the diaphragm 39 is an annular piston 43 which is movable in a cylinder 44 formed in the wall 28. The cylinder 44 communicates by a passage 45 with an outlet 46 connected to the line 47 (FIGURE 1). The space 54 to the right of the diaphragm 39 is open to atmosphere through an inlet 55. The cross-sectional area of the plunger 26 is less than the area of the accumulator member 39 exposed to the fluid pressure in the pressurizing compartment.

The plunger 26 pumps oil through a non-return valve 48 into the cylinder 44, so causing the piston 43 to move to the left against the pressure of air in the space 41 and accumulate oil under pressure in the cylinder 44. This movement continues until the piston 43 is arrested by a stop 54. The pump then ceases to operate because the pressure in the cylinder 44 is equal to that in the cylinder 27 until oil is withdrawn from the cylinder 44 through the outlet 46. As soon as this occurs, the pump will automatically commence to operate again to recharge the accumulator cylinder 44.

Although the differential air pressure actuating the pump is very small, e.g. of the order of 5 p.s.i., the pump can nevertheless develop a high output pressure, e.g. 1500 p.s.i. if the effective area of the diaphragm 17 is 300 times the cross-sectional area of the plunger 26. The effective area of the diaphragm 39, subject to air pressure at 100 p.s.i., may be ten times the cross-sectional area of the piston 43. In this case the pump will deliver oil at a pressure of 1500 p.s.i. into the accumulator where, on initial charging of the accumulator, it drops to about 1,000 p.s.i., due to the air pressure charge of 100 p.s.i. acting through a 10:1 ratio. As the pump continues working the pressure in the accumulator rises until, when the piston 43 abuts the stop 54, it will be of the order of 1,500 p.s.i., the air pressure on the other side of the diaphragm or accumulator member then being of the order of 150 p.s.i.

The power pack shown in FIGURES 3–5 is similar in principle to that just described with reference to FIGURE 2, except that the stop 154 for the accumulator piston 43 coacts with the diaphragm 39 instead of with the piston itself, but the main differences are that the pump and motor elements are double acting and has a different type of valve.

The motor member is constituted by a piston 117 connected to the plunger 26 and to the valve-actuating rod 51 and carrying cup packings 56. The valve 122 serves according to its position, either to connect the forward compartment 119 to a higher pressure and the rear compartment 121 to a lower pressure or vice versa. The higher pressure is provided by air at atmospheric pressure and the lower pressure by air at sub-atmospheric pressure derived from the induction pipe.

The valve 122 is a plate valve of lozenge shape located in a chamber 57 which is open to atmosphere. The rear face of the valve 122 as seen in FIGURES 3 and 4 makes fluid-tight sealing contact with the wall 58 of the chamber 57 and is formed with a central recess 59. A passage 60 in the wall 58 communicates with the vacuum inlet 24 (FIGURE 5) and the wall contains a passage 61 communicating with the space 121 to the right of the piston 117 and a passage 62 communicating by means of an external pipe 63 with the space 119 to the left of the piston 117. The lower end of the valve 122 rests on a cradle 64 pivoted at 65 to the upper end of a plunger 66 which is urged upwardly by a spring 67. The upper end of the valve 122 is accommodated in a cradle 68 attached to the rod 51.

When the valve occupies the position shown in FIGURE 3, the rear compartment 121 is connected to vacuum via the passage 61, the recess 59 and the passage 60, while the space 119 is subject to the atmospheric pressure on the chamber 57 via the pipe 63 and the passage 62. The piston 117 accordingly moves to the right. As it does so, the valve 122 is rocked clockwise, until it reaches the vertical position when it causes the cradle 64 to pivot in relation to the plunger 66 and throw the valve over by snap action into the alternative position shown in FIGURE 4. As will be seen, the rear compartment 121 is now subject to atmospheric pressure from the interior of the chamber 57 via the passage 61, while the forward compartment 119 is subject to vacuum, via the passage 60, the recess 59, the passage 62 and the pipe 63. The piston 117 accordingly returns to the left moving as it does so the valve 122 back to the position shown in FIGURE 3.

If desired, and as an alternative to what has just been described, the higher pressure in the chamber 57 may be provided by oil delivered from the lubricating pump and the lower pressure in the recess 59 by oil at atmospheric pressure derived from the sump.

Having now described my invention, what I claim is:

1. A self-contained pressure generator and accumulator combination which comprises a housing having a partition wall separating said housing into a motor chamber and an accumulator chamber, a source of sub-atmospheric pressure, a motor element in said motor chamber dividing said motor chamber into a forward compartment and a rear compartment and having an area on one side exposed to fluid pressure in one of said compartments and an area on the opposite side having an area exposed to fluid pressure in the other compartment, said motor element being movable in a forward, force delivering, direction and reversely, means for connecting said compartments to said source of sub-atmospheric pressure, valve means connected to said motor member for connecting said rear compartment to atmosphere and closing it from said source of sub-atmospheric pressure at the end of the reverse movement of said motor member to drive said motor member forwardly under the difference in pressure in said compartments and to said source of sub-atmospheric pressure at the end of its forward movement to equalize said pressures, resilient means to return said motor member to rear position upon equalization of said pressures, a movable accumulator member in said accumulator chamber dividing said accumulator chamber into a pressurized compartment and an accumulator compartment and a pump delivering into said accumulator compartment, said pump comprising a cylinder and a plunger connected to, and reciprocable in said cylinder by, said motor member, said plunger being of less cross-sectional area than the area of said motor member subjected to the fluid pressure in said rear motor compartment.

2. The combination of claim 1 in which said resilient means for returning said motor member to rear position is a spring mounted in said motor chamber and acting on said motor member.

3. The combination of claim 1 in which said resilient means for returning said motor member to rear position is atmospheric air admitted to said forward compartment on the return stroke of said motor member.

4. The combination of claim 1 in which said accumulator compartment comprises a cylinder of smaller cross-sectional area than the area of said accumulator member facing said pressurized compartment and in which said accumulator member comprises a part movable in said cylinder, to balance the fluid pressure in said accumulator compartment against a lesser fluid in said pressurized compartment.

5. The combination of claim 1 which comprises means for admitting air at atmospheric air to said forward compartment and to said rear compartment and in which said valve means is operable to close each compartment to said source of sub-atmospheric pressure and open it to atmosphere at alternate forward and reverse movements of said motor elements, the rear compartment being opened to atmospheric air at the end of the rearward movement of said motor element and the front element being opened at the end of the forward movement of said motor element.

6. The combination of claim 5 in which said valve member comprises a valve chamber having an inlet port for fluid at sub-atmospheric pressure, a pair of outlet ports one to each said compartment and a valve movable alternately to connect one of said outlet ports to said inlet port and expose the other to atmosphere.

References Cited in the file of this patent
UNITED STATES PATENTS

| | | |
|---|---|---|
| 862,867 | Eggleston | Aug. 6, 1907 |
| 1,621,933 | Jones | Mar. 22, 1927 |
| 1,654,673 | Barks | Jan. 3, 1928 |
| 1,905,133 | Bishop et al. | Apr. 25, 1933 |
| 2,277,641 | Harter | Mar. 24, 1942 |
| 2,324,701 | Herman | July 20, 1943 |
| 2,417,256 | Kremiller | Mar. 11, 1947 |
| 2,833,219 | Lewis | May 6, 1958 |
| 2,851,957 | Ragland | Sept. 16, 1958 |
| 2,908,137 | Spalding et al. | Oct. 13, 1959 |